United States Patent Office.

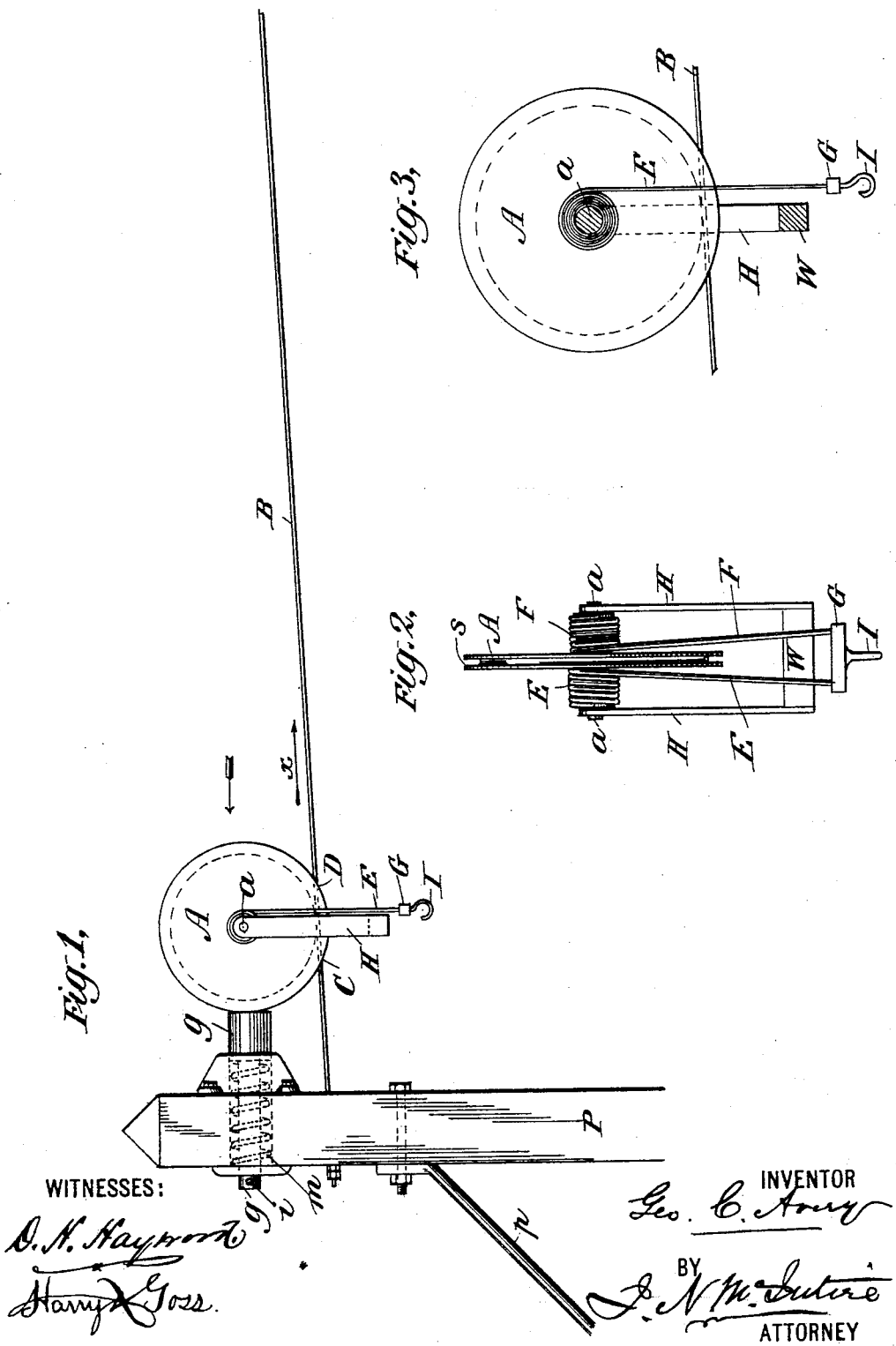

GEORGE C. AVERY, OF LOUISVILLE, KENTUCKY.

HOISTING AND CONVEYING MACHINE.

SPECIFICATION forming part of Letters Patent No. 586,350, dated July 13, 1897.

Application filed April 26, 1897. Serial No. 633,842. (No model.)

*To all whom it may concern:*

Be it known that I, GEORGE C. AVERY, of Louisville, in the county of Jefferson and State of Kentucky, have invented a new and useful Improvement in Hoisting and Conveying Machines; and I do hereby declare that the following is a full, clear, and exact description of the same, reference being had to the accompanying drawings, forming part of this specification.

My invention relates to that species of hoisting and conveying machine used mostly as a conveyer, although incidentally in the transportation of a weight or object from one locality to another the weight is delivered at a somewhat different elevation from that which it occupied at the beginning of the conveying or transporting operation, which, however, is due to the peculiar principle of construction and mode of operation of my improved device or contrivance.

In practice so far I have used my invention for the purpose of conveying molds in a foundry or molding-room from the locality at which they are made to one some distance away, where the molds are set on the floor of the molding-room to be poured; but my improved machine can of course be used with equal facility and advantage wherever it may be desired to effectuate the conveyance of any sort of object or article from one locality to another, and perhaps the proper denomination or name for the contrivance would be that of a "conveyer" or "trolley," and the last-mentioned appellation has in practice so far been applied to my improved device.

My invention has for its object to provide for use a trolley or conveyer which, while it shall be exceedingly simple in construction, will be caused to travel during the conveying operation by the gravity of the article or object to be transferred, (the gravity of which latter acts as a motor,) and which will, after having delivered its load or been relieved of its charge, return automatically to the starting-point; and to these main ends and objects my invention may be said to consist in a trolley or conveyer, comprising a simple peripherally-grooved wheel mounted to travel on an inclined wire or cable (or its equivalent) and provided with a suitable pendent weight for bringing the center of gravity of the traveling device below the level of the track on which the wheel travels, in combination with reversely-wound suspending cords or bands depending from the shaft of the traveling wheel and provided at their lower ends with some suitable means by which to carry or from which to suspend the object or article to be conveyed, all as will be hereinafter more fully explained, and as will be most particularly pointed out in the claims of this specification.

To enable those skilled in the art to which my invention relates to make and use a machine comprising the latter, I will now proceed to more fully describe my said invention, referring by letters to the accompanying drawings, which form part of this specification, and in which I have shown a trolley or conveyer embodying my said invention in that precise form in which I have so far practiced the latter, although various modifications may of course be made in the thing shown and described without departing from the spirit of said invention.

In the drawings, Figure 1 is a partial side elevation of the trolley or conveyer made according to my invention. Fig. 2 is a front view or elevation of the same, looking at the machine from the direction indicated by the arrow at Fig. 1; and Fig. 3 shows a modification of the winding-bands.

In the several figures the same part will be found always designated by the same letter of reference.

As shown in the drawings, the trolley or conveying wheel A is a simple disk-like device of a suitable diameter with a narrow face or periphery which is deeply grooved, as seen at $s$, and said wheel is mounted to travel on a slightly-inclined and strained-up wire or cable B, which latter, as shown, has its lower end fastened to a suitably firm post or support P, (which is preferably braced, as seen at $p$,) while the other end of said wire (not seen in drawings) is similarly securely fastened to some rigid support at a suitable elevation somewhat higher than that at which the lower end of said wire is secured to the post P.

In practice so far in using my invention for the special purpose hereinbefore mentioned I have arranged the track wire or cable B so as to have an inclination of about two feet in sixty feet; but this degree of inclination may of course be varied as surrounding circumstances may suggest will be expedient.

The trolley-wheel or peripherally-grooved disk A is provided with a central shaft or spindle $a$, which projects to about the same and a sufficient extent at each side of the wheel, and mounted on said spindle near its ends, so as to turn freely thereon, are two pendent bars H, which are connected at their lower ends to a heavy cross-bar W, which constitutes the steadying-weight of the conveyer and which is of sufficient gravity to insure the retention of the wheel A in a vertical position, as shown, when the trolley or device is not supporting any load or article for transportation; but it may here be remarked that I preferably make the groove $s$ in the periphery of the wheel or disk A of considerable depth, so that said grooved wheel will embrace or straddle the track wire or cable B for a considerable distance—as, for instance, from the point C to the point D (see Fig. 1)— whereby a greater tendency is exerted by the wire B to hold the wheel A in place during the operation of the conveyer.

E and F are two similar suspending ropes or bands which at their lowermost ends carry a cross-bar or cross-head G, which, as shown, is provided with a depending hook I to carry any article which it may desire to transfer, and the upper ends of which bands are secured to and wound windlass-like upon the shaft or spindle $a$ of the trolley-wheel A, the winding of said bands on said shaft being, however, in reverse directions, one being wound on the shaft right-handed and the other left-handed, as clearly illustrated at Fig. 2 of the drawings. Under this combined arrangement of parts it will be readily seen and understood that whenever the depending bands E and F may be unwound—as, for instance, by the gravity of a load or article hung on the hook I—the fixed spindle or arbor $a$ of the wheel A will necessarily be rotated, thereby causing the wheel A to turn and therefore to travel along on the supporting or track wire B, and the bands E and F are so wound on the spindle $a$, as clearly shown, that when the wheel A shall be thus caused to rotate it will travel on the wire B in the direction indicated by the arrow $x$ at Fig. 1.

In the wire-supporting post P, arranged at the lowermost end of the track-wire, is a spring-bumper or stop device, into contact with which the periphery of the traveling wheel or disk A comes when the said wheel travels or descends to its lowermost point of support on the track-wire, which bumper in the case shown is composed simply of a sliding bar $g$, suitably mounted in a housing near the upper end of the post P and provided with a spiral compression-spring $m$, arranged within the said housing, as shown, all in such manner that when the wheel A may be descending the wire B with more or less velocity it will come into contact with or up against the yielding stop or buffer-bar $g$ and will thus be brought to rest without any injurious jar or strain on any of the parts of the machine.

Now from what has so far been explained with reference to the construction of the machine and the functions of its several parts and from what is illustrated in the accompanying drawings the operation of my improved trolley or conveyer will easily be understood to be as follows: Supposing the operative parts of the machine to be at rest and in their normal positions, as seen at Fig. 1, any sufficiently heavy weight or article suspended on the hook I will cause the gradual unwinding of the pendent bands or cables E and F by which the cross-head C is supported, and thereby the grooved wheel A with all its appendages and the weight or article suspended on the hook I will be transported or conveyed to any desired destination, the wheel A traveling along on and upwardly upon the strained track-wire B. Of course the suspended weight or article may be delivered at a slightly-lower elevation than that at which it started when placed on the hook I, due to the paying out of the actuating depending bands E and F; but as the spindle or shaft $a$ on which these bands have their upper ends wound, as shown and described, is of very small diameter, while the disk of wheel A is of considerable diameter, and as the track-wire is higher at the delivery end it follows that in traveling a very considerable distance the weight suspended on the hook I will only be lowered a very short distance, if any.

Thus by the use of my improved trolley the article or weight to be transferred on being hooked onto the depending device of the trolley operates as the motor, by which the trolley or conveyer is caused to travel to the desired point for the delivery of the article or weight, and when the weight shall have been delivered or shall have been removed from the hook I the degree of inclination of the track-wire B is quite sufficient to cause the wheel A with all its attachments to descend the wire or travel back to the starting-point or the point from whence it came— i. e., to the locality illustrated in Fig. 1— where its slightly-accelerated speed will be checked by the buffer device hereinbefore described.

As a modification of the bands E and F, wound reversely on the spindle or shaft $a$ of the trolley-wheel, ribbon-like bands of sheet metal or other suitably flexible and strong material may be used, simply coiled or wound each one on itself on the shaft $a$, as illustrated at Fig. 3 of the drawings, and under such modification the action of the trolley will be slightly varied in the particular that the depending bands, which in such case would support the cross-head G, would, in operating on the spindle $a$, cause the wheel A to travel with a varying degree of velocity, since at the initial unwinding movement or travel of the conveyer with its load the latter would operate with more leverage and force than it would at the end of the line of travel, and in like manner during the return of the empty trolley or conveyer to the position seen at Fig. 1 the weight of the pendent cross-head would operate with increasing power, and thus have a tendency to gradually overcome the accelerated movement downgrade of the wheel A and its attachments. The general principle of operation, however, for practical purposes would be about the same, and all the main advantages would remain unchanged whether one or the other modifications shown be adopted.

Having now so fully explained the construction and operation of my improved machine that those skilled in the art can make and use the same, what I claim as new, and desire to secure by Letters Patent, is—

In a conveyer, or trolley, for the transportation of loads, the combination, with an inclined track-wire, or roadway, of the peripherally-grooved wheel, mounted to travel thereon; a centrally-arranged shaft, or spindle, made fast to said wheel; a suitable balancing-weight, depending from the said shaft and operating to bring the center of gravity of the said wheel, and its attachments, below the line of the track-wire; and depending bands, or cables, wound on the said wheel-shaft, and provided at their lower ends, with means for carrying the load, or weight, to be transported; all substantially as, and for the purposes hereinbefore set forth.

In witness whereof I have hereunto set my hand this 19th day of March, 1897.

GEORGE C. AVERY.

In presence of—
  CHARLES F. HUHLEIN,
  W. T. AVERY.